June 19, 1956

A. H. HARGROVE 2,751,493

NOISE SQUELCH SYSTEM

Filed Oct. 22, 1953

ATWOOD H. HARGROVE
*INVENTOR.*

*BY*

Killman and Kerst
ATTORNEYS 2,751,493
Patented June 19, 1956

2,751,493

NOISE SQUELCH SYSTEM

Atwood H. Hargrove, Baltimore, Md., assignor to Bendix Aviation Corporation, Towson, Md., a corporation of Delaware Application October 22, 1953, Serial No. 387,751

4 Claims. (Cl. 250—20)

The present invention relates to noise squelch systems for radio receivers, and more particularly, to a noise regulated system for controlling the output of a frequency or angle modulated carrier wave receiver.

Noise squelch systems are well known in the art. The benefit derived from such systems is the squelching or muting of the output of a receiver when the signal-to-noise ratio is low such that the output would be unintelligent.

An object of this invention is to provide a sensitive noise squelch system.

Another object of this invention is to provide a noise squelch system that will produce an output for squelching purposes that is a differential function of the noise signal and the noise plus intelligence signal.

Still another object of this invention is to provide a system whereby, when the system is saturated by noise signals, random noise signals will not remove the squelching voltage.

A further object of this invention is to provide a noise squelching system that is relatively simple such that it may be economically and easily constructed and easily adjusted.

A still further object of this invention is to provide a squelching system that does not require special biasing, filament, or plate voltage sources other than increasing the capacities of the sources existing in the equipment into which the squelch system is to be added.

These and other objects are realized in a system wherein an amplifying tube and a rectifying tube are coupled to a limiting stage of an FM or AM receiver by a network of resistors and capacitors. The input to the amplifying tube consists of two signals. One signal is obtained from the output of the limiting stage by virtue of a portion of said network and is a function of the noise signal. The second signal is obtained from the grid of the tube in the limiting stage by virtue of the remainder of said network and contains D. C. and A. C. components which are functions of the noise and intelligence signals. These two signals are operated upon differentially by the amplifying tube with the resulting signal being rectified by the rectifying tube. The output from the rectifying tube is filtered and made available for squelching purposes.

Referring to the drawings.

Figure 1:
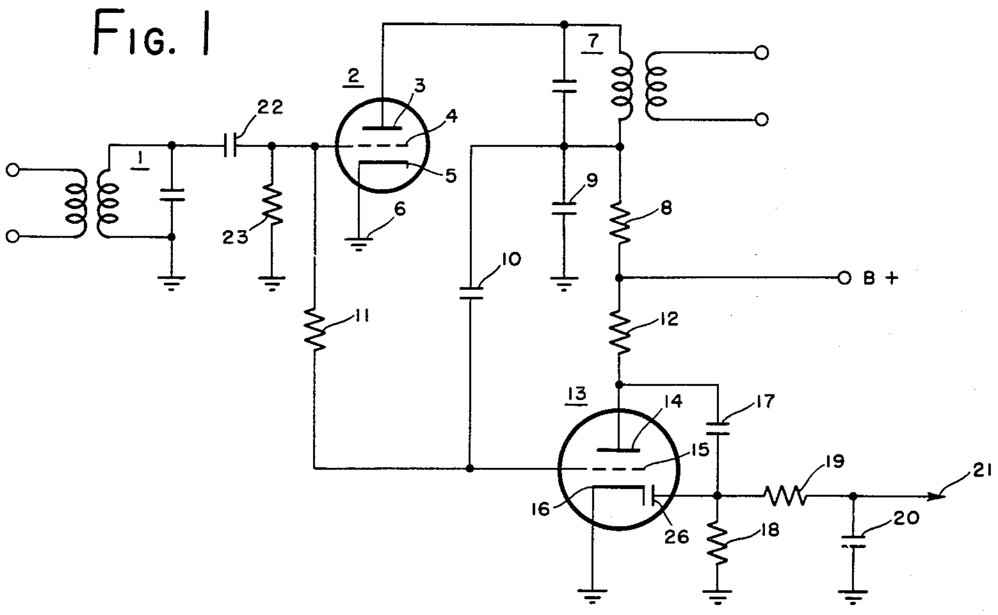
Fig. 1 is a schematic diagram of a circuit illustrating the invention.

In particular, Fig. 1 is a schematic diagram of a typical I. F. limiting stage of a frequency or angle modulated receiver with a circuit illustrating the invention connected thereto for obtaining a voltage suitable for squelching or muting purposes. A tuned circuit 1, the inductor portion thereof being the secondary winding of an I. F. coupling transformer, is connected between a ground reference 6 and the grid 4 of a tube 2 by virtue of a capacitor 22. A resistor 23 extends between the grid 4 and the ground reference 6. The cathode 5 of the tube 2 is joined to the ground reference 6 while the plate 3 thereof is joined to one end of a tuned circuit 7 whose inductor portion consists of the primary winding of an I. F. coupling transformer. The other extremity of the tuned circuit 7 is connected to a B+ source of energy through a resistor 8. A capacitor 9 is connected between the second extremity of the tuned circuit 7 and the ground reference 6. A capacitor 10 is connected between the second extremity of the tuned circuit 7 and the grid 15 of a tube 13. The grid 15 is connected to the grid 4 by a resistor 11. The cathode 16 of the tube 13 is joined to the ground reference 6 while the plate 14 thereof is returned to the B+ source of energy through a resistor 12. A capacitor 17 joins the plate 14 to a second plate 26 of the tube 13. The plate 26 is returned to the ground reference 6 through a resistor 18. A resistor 19 is connected between the plate 26 and an output terminal 21 while a capacitor 20 is connected between the output terminal 21 and ground reference 6.

The I. F. limiting stage, whose component parts are the tuned circuits 1 and 7, the tube 2, the capacitors 9 and 22, and the resistors 8 and 23, operates in the manner of a typical I. F. limiting stage. The tuned circuits 1 and 7 are designed to resonate at the I. F. signal frequency such that high impedances exist across the extremities thereof. The capacitor 22 couples the signal from the tuned circuit 1 into the grid 4 while maintaining the D. C. potential of the grid 4 above the ground reference 6. The insertion of the resistor 23 between the grid 4 and the ground reference 6 provides grid leak biasing for the tube 2. The level of the I. F. signal appearing across the capacitor 9 is small with respect to the signal appearing across the tuned circuit 7 as the value of the capacitor 9 is chosen such that the impedance thereof is small with respect to the impedance across the tuned circuit when both are measured at the I. F. signal frequency.

When the incoming I. F. signal to the tube 2 causes limiting to occur, increasing the incoming signal will not increase the output of the stage. During the absence of an I. F. signal, the noise signal level in the receiver increases. The noise signal may also be limited by the limiting stage.

Because the noise signal frequencies are different from the I. F. signal frequency, the tuned circuit 7 does not appear as a high impedance circuit to the noise signals. Therefore, at these frequencies, the resistor 8 and capacitor 9 acts as a plate load for the tube 2 and the amplified noise signal appears across this load. The capacitor 10 couples into the grid 15 the noise signal appearing across the resistor 8 and capacitor 9. The signal is amplified and appears across the plate load resistor 12. The capacitor 17 couples the amplified noise signal into the diode section of the tube 13 where it is rectified by the plate 26 and the cathode 16 and filtered by the resistor 19 and the capacitor 20. The negative D. C. voltage appearing between the terminal 21 and the ground reference 6 is therefore a function of the amplitude of the noise signal developed across the resistor 8.

Another signal appearing on the grid 15 is that coupled thereto from the grid 4 by the resistor 11. This signal contains a D. C. component because of the rectifying action of the grid 4 on the incoming signal. The efficiency of the filter action produced by the resistor 11 and the capacitors 9 and 10 is higher at the I. F. signal frequencies than at the lower noise signal frequencies and therefore, both A. C. and D. C. components are coupled to the grid 15 in the presence of noise voltage alone at grid 4.

The other component of the signal coupled to the grid 15 from the grid 4 is the incoming signal after it has been modified by the rectification action of the grid 4. The portion of this component that is applied to the grid 15 is determined by the voltage divider network consisting of the resistor 11, and the capacitors 9 and 10.

By the proper choice of components, the three above discussed voltages function to provide a squelching voltage when the signal-to-noise ratio fails to exceed a predetermined value. To illustrate this, assume a first condition whereby the incoming signal is primarily a noise signal and a second condition whereby the incoming signal is primarily an I. F. signal. Under the first condition, whereby the incoming signal is primarily a noise signal, the voltage divider network, consisting of the resistor 11 and the capacitors 9 and 10, is so constructed that the effect caused by the modified incoming signal component of the signal appearing on the grid 15 opposes the effect caused by the negative D. C. voltage produced by the rectification action of the grid 4. At the same time the noise voltage developed across capacitor 9 and resistor 8 and coupled to the grid 15 through the capacitor 10 is at a maximum. Therefore, the output at the point 21 is a function of the signal coupled into the grid 15 by the capacitor 10. That is, the signal coupled into the grid 15 by the resistor 11 does not effect the output at the point 21. When the I. F. amplifying stage saturates, the output voltage at the point 21 will be at a maximum. Therefore, the system following the point 21 is designed such that the muting action produced by the output voltage occurs before this condition is reached.

Under the second condition, whereby the incoming signal is primarily an I. F. signal, a relatively small signal is coupled into the grid 15 by the capacitor 10 due to the ratio of impedances of the tuned circuit 7 and the resistor-capacitor network 8, 9 and the predominance of signal voltage in the plate circuit of the limiting stage. Because of the more efficient filtering operation of the network connected to the grid 4, a greater D. C. potential is received at the grid 15, while the modified incoming signal arriving at the grid 15 is less because of the change in the ratio of the impedances of the components in the divider network with the increase of the signal frequency. Therefore, the grid 15 will have a relatively small A. C. signal and a relatively large negative D. C. signal on it. By the proper choice of values for the components, the tube 13 will be cut-off and the muting voltage at the point 21 will be zero.

In the description of the operation of the circuit of Fig. 1, a choice of components was used such that under the condition where a noise signal was present, the effects of the component parts of the signal received from the grid 4 were zero. Obviously, the ratio of the component impedances may be changed such that an effect may be received at the output terminal.

Figure 2:
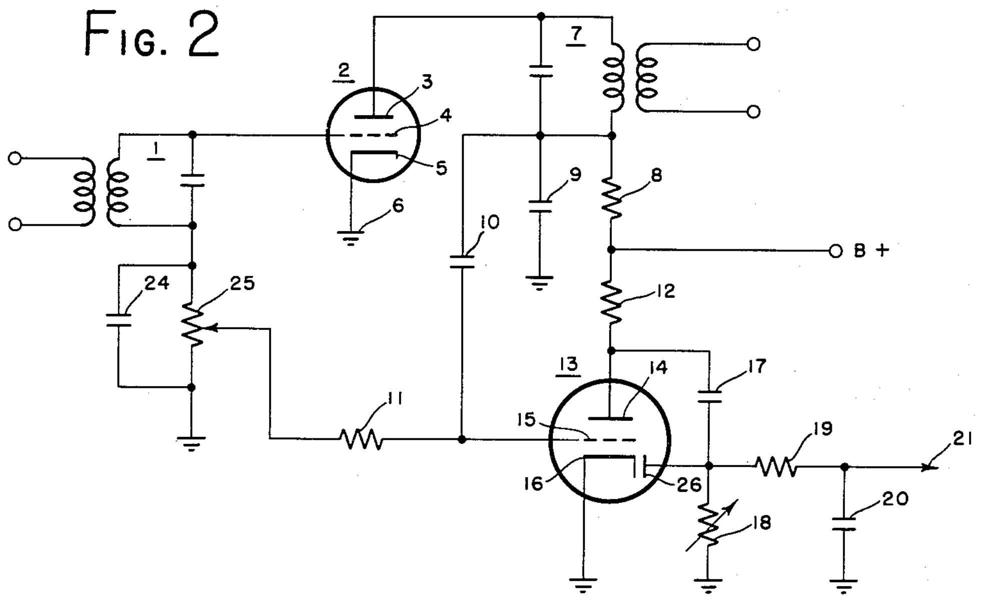
Fig. 2 is a schematic diagram of another circuit illustrating the invention.

The circuit depicted by the schematic drawing of Fig. 2 is similar to the circuit illustrated by the schematic drawing of Fig. 1. The second circuit differs from the first circuit in that the signal from the grid 4 is obtained by a different means. Referring to Fig. 2, the parallel combination of a resistor 25 and a capacitor 24 displaces the tuned circuit 1 from the ground reference 6 by being inserted therebetween. The signal that is obtained from this arrangement has the same general characteristics as the characteristics of the signal from the circuit shown in Fig. 1.

Although a preferred embodiment of the invention, along with one variation, has been used for the explanation thereof, it is to be understood that modifications familiar to those skilled in the art may be made without departing from the invention.

What is claimed is:

1. In a frequency or angle modulation receiver containing an amplitude limiting amplifier, a noise squelching system comprising: a pair of serially connected impedance means connected as the load impedance in said limiting amplifier; said pair of impedance means being so constructed that amplified intelligence signals are developed across one of said means and amplified noise signals are developed across the second of said means; a third means in the input circuit of said limiting amplifier to derive a signal, containing D. C. and A. C. components, from the signal applied thereto; a second amplifier; means coupling said output signals from said third means and said second of said impedance means to the input terminal of said second amplifier; said coupling means including a voltage dividing network; the components of said dividing network being selected so that, in the presence of an input signal to the limiting amplifier consisting predominantly of noise, the effects of said D. C. and A. C. components from said output of said third means produced at the output of said second amplifier cancel one another; and means rectifying and filtering said output of said second amplifier to produce a squelching voltage.

2. In a frequency or angle modulation receiver containing an amplitude limiting amplifier, a noise squelching system comprising: a pair of serially connected impedance means connected as the load impedance in said limiting amplifier; said pair of impedance means being so constructed that amplified intelligence signals are developed across one of said means and amplified noise signals are developed across the second of said means; a third means in the input circuit of said limiting amplifier to derive a signal, containing D. C. and A. C. components, from the signal applied thereto; a second amplifier; means coupling said output signals from said third means and said second of said impedance means, to the input terminal of said second amplifier; said coupling means including a voltage dividing network; the components of said dividing network being selected so that, in the presence of an input signal to the limiting amplifier consisting predominantly of noise, the effects of said D. C. and A. C. components from said output of said third means produced at the output of said second amplifier oppose one another; and means rectifying and filtering said output of said second amplifier to produce a squelching voltage.

3. In a frequency or angle modulated receiver containing an amplitude limiting stage, a noise squelching system comprising: a first amplifying tube, a pair of serially connected impedance networks connected as the load impedance of said limiting stage, the first of said networks having a higher impedance for currents of the useful frequency range of said stage than for frequencies outside said range; a capacitor connected to the junction of said networks; a second amplifying tube in said limiting stage, impedance elements connected between the input of said second tube and said capacitor and means connecting the junction of said capacitor and said impedance elements to the input of said first tube, whereby said last named impedance elements, said capacitor and the second of said impedance networks form an A. C. voltage dividing network connecting said inputs, said voltage dividing network coupling to said input of said first tube a signal consisting of D. C. and A. C. components and said capacitor coupling thereto a signal from the output of said limiting stage; a rectifying tube; means coupling the output of said first tube to said rectifying tube for rectification thereby and means filtering the output of said rectifying tube.

4. In a frequency or angle modulated receiver containing an amplitude limiting stage having an output circuit, a noise squelching system comprising: a first amplifying tube, a pair of serially connected impedance networks connected in the output circuit of said limiting stage as the load impedance thereof, the first of said networks having a higher impedance for currents of the useful frequency range of said stage than for frequencies outside said range; a capacitor connected to the junction of said networks; a second amplifying tube in said limiting stage, impedance elements connected between the input of said second tube and said capacitor and means connecting the junction of said capacitor and said impedance elements to the input of said first tube, whereby said impedance elements, said capacitor and the second of said impedance networks form a voltage dividing network connecting said inputs, said voltage dividing network coupling to said input of said first tube a signal consisting of D. C. and A. C. components and said capacitor coupling thereto a signal from the output of said limiting stage, said voltage divider network having the values of its components so selected that it filters A. C. components from said signal coupled to said input of said first tube thereby, said filtering action being more effective at the frequencies lying within the useful frequency range of said limiting stage than at frequencies below said range; a rectifying tube; means coupling the output of said first tube to said rectifier tube for rectification thereby and means filtering the output of said rectifier tube.

References Cited in the file of this patent

UNITED STATES PATENTS

| | | |
|---|---|---|
| 2,409,139 | Magnuski | Oct. 8, 1946 |
| 2,455,450 | Thompson | Dec. 7, 1948 |
| 2,527,617 | Berger | Oct. 31, 1950 |
| 2,531,433 | Hoffman et al. | Nov. 28, 1950 |
| 2,586,190 | Wasmansdorff | Feb. 19, 1952 |
| 2,589,711 | Lacy | Mar. 18, 1952 |